United States Patent
Motwani et al.

(10) Patent No.: US 10,678,622 B2
(45) Date of Patent: Jun. 9, 2020

(54) OPTIMIZING AND SCHEDULING MAINTENANCE TASKS IN A DISPERSED STORAGE NETWORK

(71) Applicant: International Business Machines Corporation, Armonk, NY (US)

(72) Inventors: Manish Motwani, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 292 days.

(21) Appl. No.: 15/426,380

(22) Filed: Feb. 7, 2017

(65) Prior Publication Data
US 2017/0249203 A1  Aug. 31, 2017

Related U.S. Application Data

(60) Provisional application No. 62/301,214, filed on Feb. 29, 2016.

(51) Int. Cl.
*G06F 11/07* (2006.01)
*G06Q 10/06* (2012.01)
*G06F 3/06* (2006.01)

(52) U.S. Cl.
CPC ...... *G06F 11/0781* (2013.01); *G06F 11/0727* (2013.01); *G06F 11/0793* (2013.01);
(Continued)

(58) Field of Classification Search
CPC .............. G06F 11/004; G06F 11/0709; G06F 11/0727; G06F 11/0781; G06F 11/0793;
(Continued)

(56) References Cited

U.S. PATENT DOCUMENTS 4,092,732 A   5/1978   Ouchi
5,454,101 A   9/1995   Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Gabriel Chu
(74) *Attorney, Agent, or Firm* — Garlick & Markison; Timothy W. Markison; Harry S. Tyson, Jr.

(57) ABSTRACT

Monitoring the health status of a distributed storage network (DSN) and scheduling maintenance tasks relating to identified memory failures. In various examples, monitoring the health status of the DSN can include obtaining status information regarding storage units of the DSN and, based thereon, determining that memory of one or more of the storage units requires repair. Physical locations for identified storage units are determined, as well as the level of data loss risk associated with encoded data stored in the storage units. Based on this information, a repair plan is generated for and issued to the identified storage units. A repair plan may include, for example, an ordered list of maintenance tasks that are prioritized to balance data loss risk considerations with repair effort efficiency considerations. The maintenance tasks may be mapped to available service operators for performing the desired repairs (e.g., based on physical locations of the storage units).

18 Claims, 6 Drawing Sheets

(52) U.S. Cl.
CPC .............. *G06Q 10/06316* (2013.01); *G06Q 10/063116* (2013.01); *G06F 3/067* (2013.01)

(58) Field of Classification Search
CPC .... G06F 3/0629; G06F 3/0644; G06F 3/0614; G06F 3/0617; G06F 11/2053; G06F 11/2094; G06F 11/3006; G06F 11/3034; G06F 11/3037; G06Q 10/06316; G06Q 10/20; G06Q 10/063116
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,496,814 | B1* | 12/2002 | Busche ............... G06Q 10/10 706/21 |
| 6,516,425 | B1* | 2/2003 | Belhadj ............ G06F 11/1092 714/15 |
| 6,567,948 | B2 | 5/2003 | Steele et al. |
| 6,571,282 | B1 | 5/2003 | Bowman-Amuah |
| 6,578,144 | B1 | 6/2003 | Gennaro et al. |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,305,579 | B2* | 12/2007 | Williams ............ G06F 11/1092 714/6.32 |
| 7,574,623 | B1* | 8/2009 | Goel ................... G06F 11/008 714/47.2 |
| 7,636,724 | B2 | 12/2009 | de la Torre et al. |
| 8,719,320 | B1* | 5/2014 | Brooker .............. G06Q 10/10 707/827 |
| 9,075,773 | B1* | 7/2015 | Rakitzis ............. G06F 11/2094 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0021359 | A1* | 1/2005 | McKinney ........... G06Q 10/06 705/7.11 |
| 2005/0060618 | A1* | 3/2005 | Guha .................. G06F 11/008 714/54 |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2005/0268147 | A1* | 12/2005 | Yamamoto ........... G06F 3/0617 714/2 |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0289122 | A1* | 11/2011 | Grube ................ G06F 11/2094 707/812 |
| 2012/0173300 | A1* | 7/2012 | Davenport ........... G06Q 10/063 705/7.28 |
| 2013/0190095 | A1* | 7/2013 | Gadher ................ G06F 11/008 463/42 |
| 2014/0108815 | A9 | 4/2014 | Dhuse et al. |
| 2014/0156716 | A1* | 6/2014 | Baptist ................ G06F 16/182 707/827 |
| 2014/0331086 | A1* | 11/2014 | Resch ................ G06F 11/1458 714/15 |
| 2014/0337622 | A1 | 11/2014 | Resch et al. |
| 2015/0074462 | A1* | 3/2015 | Jacoby ................ G06F 11/079 714/37 |
| 2015/0113324 | A1* | 4/2015 | Factor ................. G06F 16/245 714/20 |
| 2016/0078695 | A1* | 3/2016 | McClintic .......... G06Q 10/06 701/29.4 |
| 2016/0253240 | A1* | 9/2016 | Cocagne ............. G06F 3/0619 714/764 |
| 2016/0301558 | A1* | 10/2016 | Twiss ................. H04L 41/0853 |
| 2017/0300374 | A1* | 10/2017 | Gladwin ............ G06F 11/0727 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
International Searching Authority; International Search Report and Written Opinion; International Application No. PCT/IB2017/051010; Jun. 15, 2017; 12 pgs.

* cited by examiner

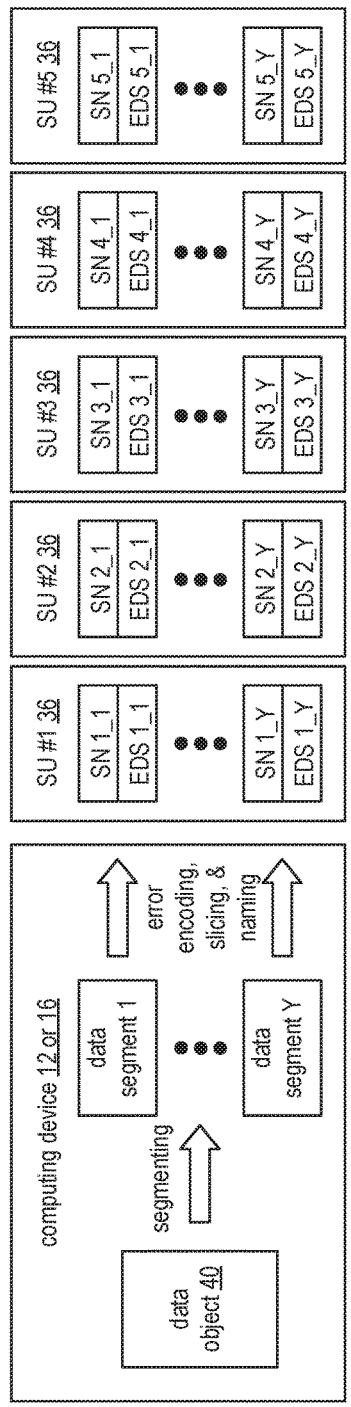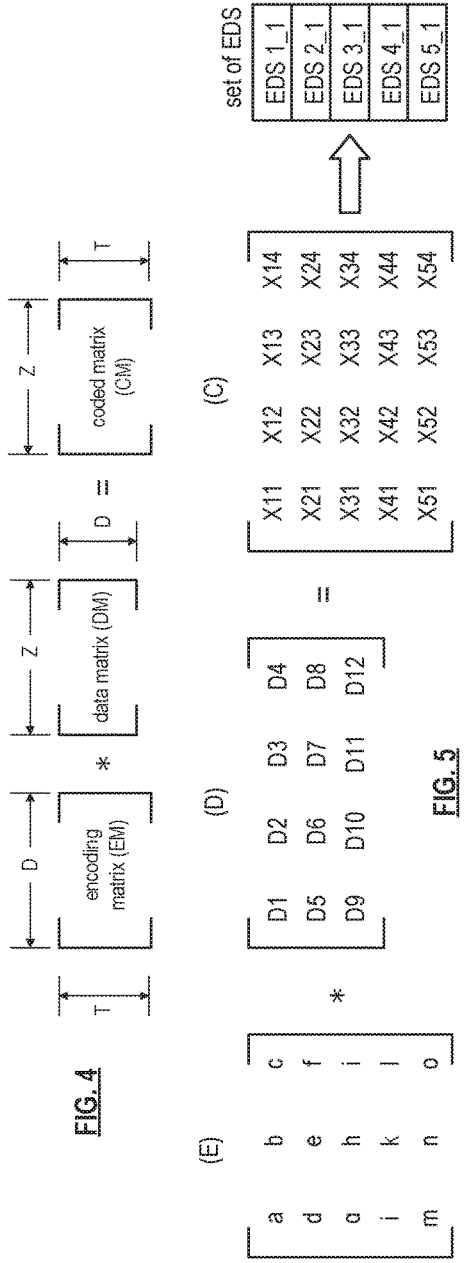

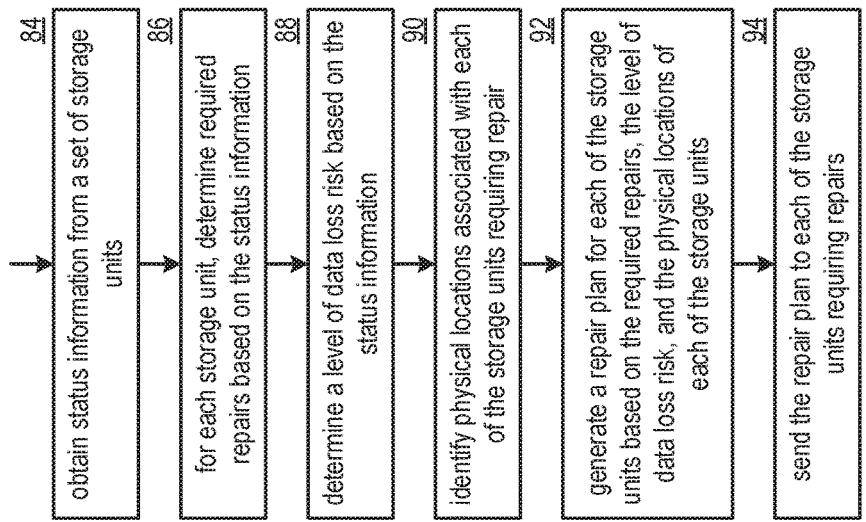

OPTIMIZING AND SCHEDULING MAINTENANCE TASKS IN A DISPERSED STORAGE NETWORK

CROSS-REFERENCE TO RELATED APPLICATIONS

The present U.S. Utility Patent Application claims priority pursuant to 35 U.S.C. § 119(e) to U.S. Provisional Application No. 62/301,214, entitled "ENHANCING PERFORMANCE OF A DISPERSED STORAGE NETWORK," filed Feb. 29, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to facilitating maintenance tasks in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

FIG. 10 is a logic diagram illustrating an example of prioritizing storage unit repair and maintenance operations in accordance with the present disclosure.

DETAILED DESCRIPTION OF THE INVENTION

Figure 1:
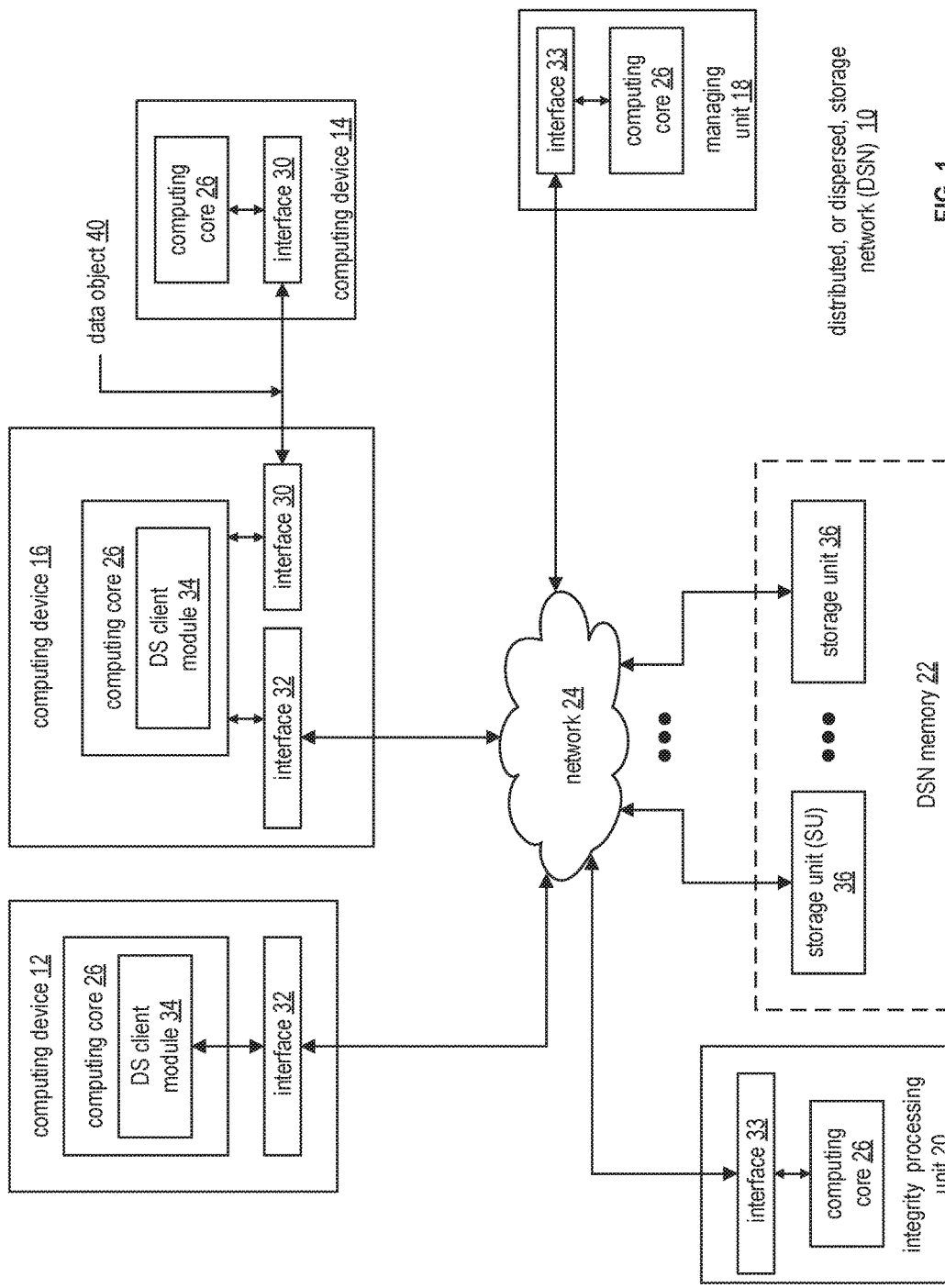
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
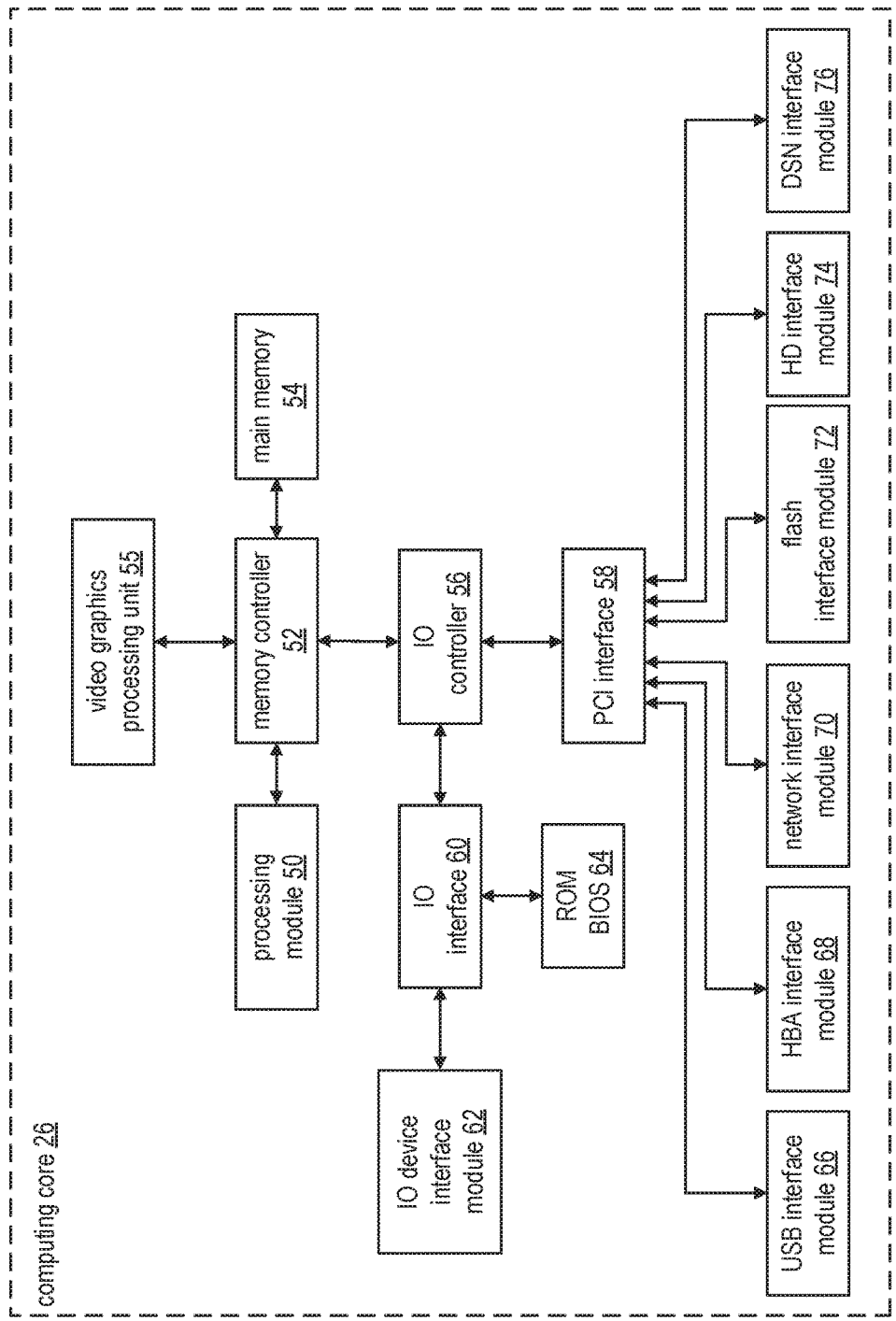
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test or maintenance tasks, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
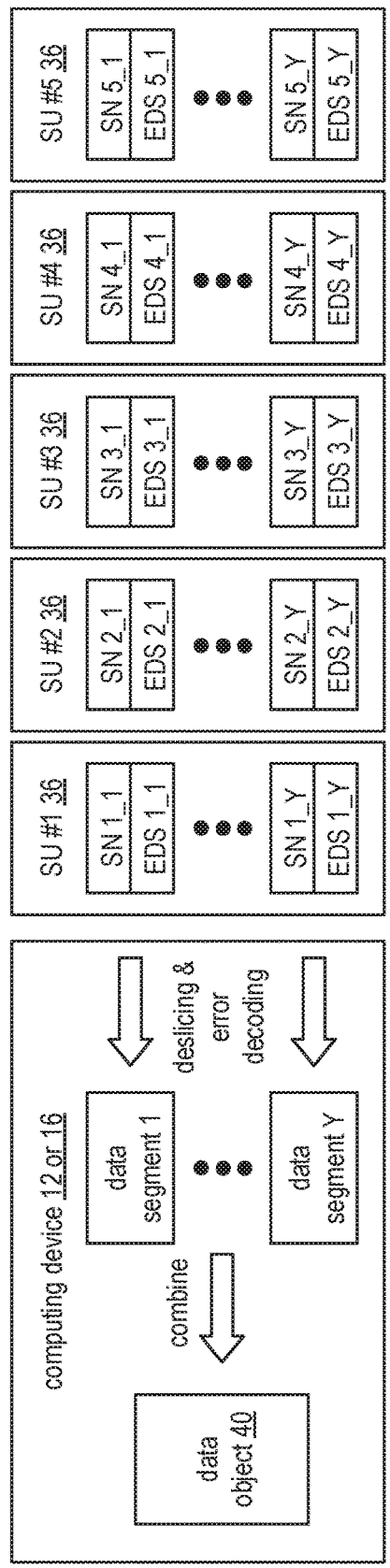
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
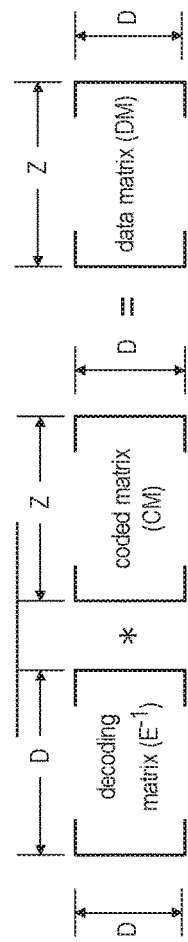
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Over time, it is natural for storage units and memory devices of a dispersed storage network to require maintenance, repair, or even replacement in the case of a failure event. As described more fully below in conjunction with the novel examples of FIGS. 9 and 10, a management unit of the DSN is tasked with ensuring the overall health of stored data and DSN memory. For example, the management unit determines which memory devices within storage units have failed (or are likely to fail) and require repair or replacement, and generates an optimized strategy for performing (e.g., by service operators/field technicians) the desired tasks.

Scheduling of repairs may be based on a number of factors, including: the degree to which data is at risk (e.g., determining the number of simultaneous failures that affect a given portion of the DSN namespace; the location and number of service operators available to perform maintenance operations; whether a storage unit requires multiple memory replacements which could be performed simultaneously; an optimal route between impacted storage units; and an average or expected amount of time required to perform a task. Taking such factors into account, the management unit derives an ordered list of maintenance tasks, with each list or maintenance task being mapped to a service operator.

Figure 9:
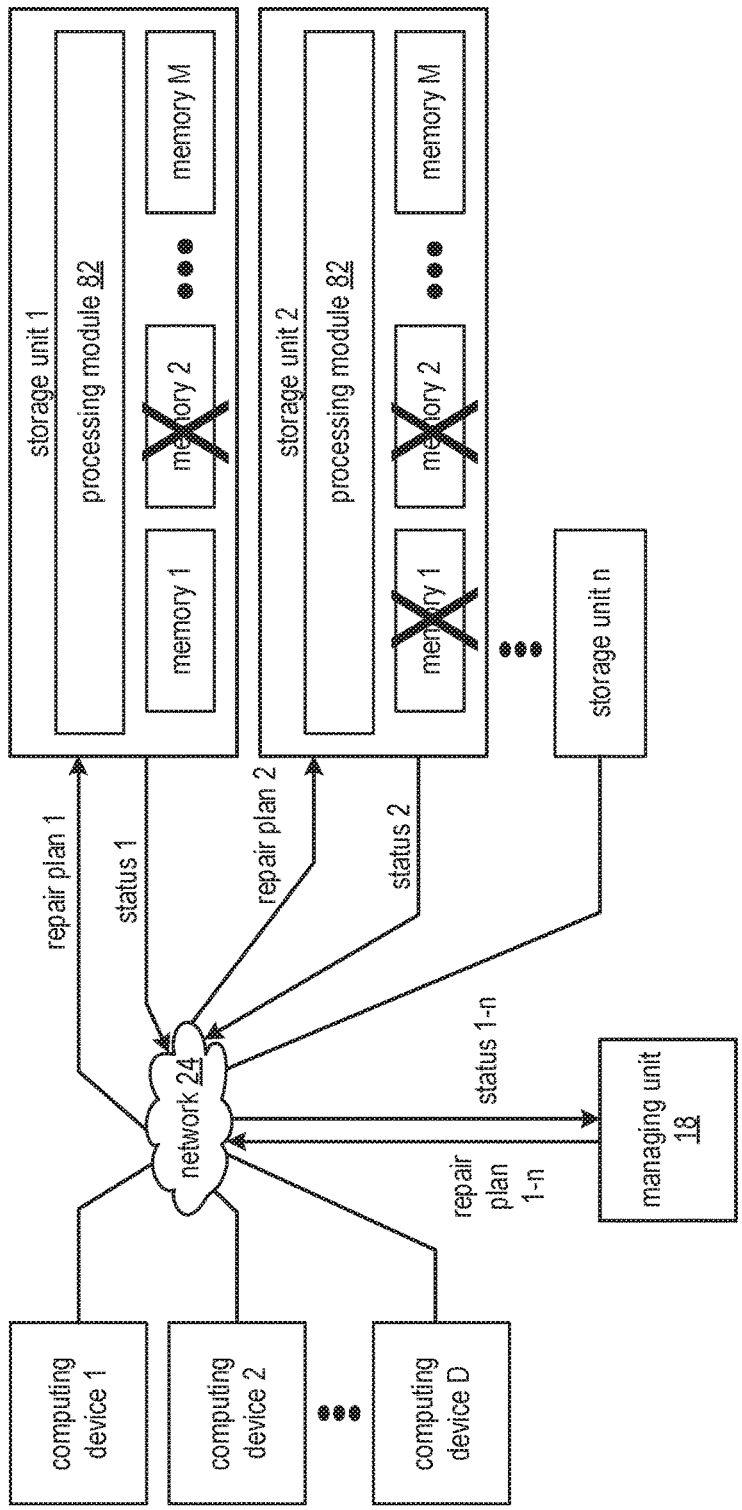
FIG. 9 is a schematic block diagram of another embodiment of a DSN performing prioritized storage unit repair and maintenance operations in accordance with the present disclosure.

Referring more specifically to FIG. 9, a schematic block diagram of an embodiment of a DSN performing prioritized storage unit repair and maintenance operations in accordance with the present disclosure is shown. The illustrated DSN includes a plurality of computing devices 1-D, the network 24 of FIG. 1, the managing unit 18 of FIG. 1, and a set of storage units 1-n. Each storage unit 1-n may be implemented utilizing the storage unit 36 of FIG. 1, and each of the storage units includes a processing module 82, a DS client module 34, and a plurality of memories 1-M. The storage units 1-n of a storage set may be located at a same physical location (site) or located at multiple physical locations without departing from the technology as described herein. The DSN functions to prioritize storage unit replacement/repair and maintenance operations.

In general, DSN memory stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In an example of operation of the prioritizing of the storage unit repair operations, the managing unit 18 obtains status information 1-n from the set of storage units 1-n. The status information provides an indication of memory failure, and may also include a scheduled replacement time frame for a memory device. Obtaining status information includes one or more of interpreting a query response, interpreting a received error message, and receiving the status information. For example, the managing unit 18 receives, via the network 24, status information 1 indicating that the memory 2 of the storage unit 1 has failed, and the managing unit 18 receives, via the network 24, status information 2 indicating that the memories 1-2 of the storage unit 2 have failed.

Having received the status information, the managing unit 18 determines, for each storage unit, required repairs based on the status information associated with the storage unit. Determining repairs generally includes indicating a memory replacement is necessary when a memory has failed. For example, the managing unit 18 indicates that memory 2 of the storage unit 1 is to be replaced when receiving the status information 1 indicating that the memory 2 has failed, etc.

Having determined the required repairs, the managing unit 18 determines a level of data loss risk based on the status information. In one example, determining data loss risk includes identifying how many encoded data slices remain available for a given set of encoded data slices with respect to a minimum number of encoded data slices required (e.g., a decode threshold number) to prevent data loss. The managing unit 18 may determine to initiate a repair process if, for example, more than one (or another number) of encoded data slices of a set of encoded data slices is lost, corrupt, or at risk, such as when recent loss of related encoded data slices is detected.

Having determined the level of data loss risk, the managing unit 18 identifies physical locations associated with each of the storage units requiring repair to enable a travel plan component of an overall repair plan. Identifying physical locations includes one or more of performing a lookup, interpreting coordinate information, and interpreting a configuration map. Having identified the physical locations, the managing unit 18 generates a repair plan for each of the storage units based on the required repairs, the level of data loss risk, and the physical locations of each of the storage units. Generating a repair plan may include, for example, determining the repair plan to optimize a balance between data loss avoidance considerations and repair effort efficiency considerations (e.g., as estimated from identified physical locations and/or the number and type of repairs to be performed on individual storage units) such that data loss risk level considerations are assigned an increasing amount of importance as the data loss risk level increases. Having generated the repair plan, the managing unit 18 sends the repair plan to each of the storage unit requiring repairs. For example, the managing unit 18 issues, via the network 24, repair plans 1-*n* to the set of storage units 1-*n*.

In an example of operation, the management unit 18 analyzes various factors (such as mentioned above) to derive an ordered list or lists of maintenance tasks. Each such list may be further mapped to a service operator. For example, the number and types of tasks assigned to each operator may be determined such that an approximately equal amount of time will be required by each operator to perform respective tasks. The tasks at the top of the list may be those that are deemed most critical for purposes of restoring reliability of data in the DSN memory.

In a further example of operation, the managing unit 18 monitors outstanding repair issues/tasks and may adjust a repair plan or reassign tasks. The managing unit 18 may also determine an escalation level for outstanding issues, and issue one or more notifications in accordance with the escalation level. Issuing a notification may include identifying a notification recipient based on the escalation level in accordance with an escalation list (e.g., field technicians up to senior managers within an organization responsible for repairs), and generating the notification to include one or more of the status information, the issue age, the impact category, and the escalation level, and sending the notification to the identified notification recipient. For example, the managing unit 18 sends a notification to a local field service technician with regards to a failure of the memory 2 of the storage unit 1 and sends another notification to a senior service manager with regards to the failure of the memories 1-2 of the storage unit 2 when a higher probability of data loss exists.

FIG. 10 is a logic diagram illustrating an example of prioritizing storage unit repair and maintenance operations in accordance with the present disclosure. The method includes a step 84 where a processing module (e.g., of a managing unit 18) obtains status information from a set of storage units. Obtaining status information may include one or more of interpreting a query response, interpreting a received error message, and receiving the status information.

For each storage unit, the method continues at step 86 where the processing module determines required repairs based on the status information. For example, the processing module indicates a memory replacement operation is needed when a memory has failed. The method continues at step 88 where the processing module determines a level of data loss risk based on the status information. For example, the processing module indicates how many encoded data slices of a set of encoded data slices are still available in relation to a decode threshold number.

The method continues at step 88 where the processing module identifies physical locations associated with each of the storage units requiring repair. Identifying such physical location may include at least one of performing a lookup, interpreting coordinate information, and interpreting a configuration map. Next, at step 90, the processing module generates a repair plan for each of the storage units requiring repair based on the nature of the required repairs, the level of data loss risk, and the physical locations of each of the storage units. Generating a repair plan includes determining a plan that optimizes and/or balances one or more of repair effort efficiency and data loss avoidance. The method continues at step 92 where the processing module sends a corresponding repair plan to each of the storage units requiring repairs. Repair plan information may further be transmitted to one or more service operators identified for performing the desired repairs.

The methods described above in conjunction with the managing unit 18 and storage units can alternatively be performed by other modules (e.g., DS client modules 34) of a dispersed storage network or by other devices (e.g., integrity processing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the DSN including a set of storage units having memory storing encoded data, the encoded data including a set of encoded data slices corresponding to a data segment of a data object, wherein a decode threshold number of encoded data slices of the set of encoded data slices is required to recover the data segment, the method comprises:

obtaining status information regarding storage units of the set of storage units, the status information providing an indication of memory failure;

determining, based on the status information, that memory of a plurality of storage units of the set of storage units requires repair;

determining, based on the status information, a level of data loss risk associated with the encoded data stored in the plurality of storage units, including determining a number of the encoded data slices of the set of encoded data slices that are unavailable in respective storage units of the plurality of storage units, wherein the level of data loss risk associated with a storage unit is determined to increase as the number of the encoded data slices determined to be unavailable in the storage unit increases;

identifying a physical location for each storage unit of the plurality of storage units having at least one encoded data slice determined to be unavailable;

generating an overall repair plan based, at least in part, on the level of data loss risk associated with each storage unit of the plurality of storage units, the overall repair plan including a respective repair plan for each storage unit of the plurality of storage units, wherein repairs associated with a highest determined level of data loss risk are prioritized in the overall repair plan; and issuing each respective repair plan for receipt by a corresponding storage unit of the plurality of storage units.

2. The method of claim 1, wherein generating the overall repair plan includes generating an ordered list of maintenance tasks to be performed on the plurality of storage units.

3. The method of claim 2, wherein maintenance tasks associated with the highest determined level of data loss risk are prioritized in the ordered list of maintenance tasks.

4. The method of claim 2 further comprises:
mapping each of the maintenance tasks to at least one service operator.

5. The method of claim 4, wherein mapping each of the maintenance tasks to the at least one service operator includes:
estimating an amount of time required to perform each of the maintenance tasks; and
mapping the maintenance tasks to a plurality of service operators such that an approximately equal amount of time is estimated to be required of each of the plurality of service operators to perform respective maintenance tasks as mapped.

6. The method of claim 1, wherein determining a level of data loss risk associated with encoded data stored in the plurality of storage units further includes determining an amount of unavailable encoded data that is related to the set of encoded data slices.

7. The method of claim 1, wherein identifying a physical location for each of the plurality of storage units includes at least one of performing a lookup, interpreting coordinate information, or interpreting a configuration map.

8. The method of claim 1, wherein determining that memory of the plurality of storage units requires repair includes receiving status information indicating that a memory has failed.

9. A distributed storage network (DSN) comprising:
at least one DSN memory, the DSN memory including a set of storage units for storing encoded data slices, including a set of encoded data slices corresponding to a data segment of a data object, wherein a decode threshold number of encoded data slices of the set of encoded data slices is required to recover the data segment;
at least one management unit implemented using at least one processor and associated memory, the management unit configured to monitor a health status of the DSN by:
obtaining status information regarding storage units of the set of storage units, the status information providing an indication of memory failure;
determining, based on the status information, that memory of a plurality of storage units of the set of storage units has failed or is at risk of immediate failure;
determining, based on the status information, a level of data loss risk associated with the set of encoded data slices, including determining a number of encoded data slices of the set of encoded data slices that are unavailable in the plurality of storage units, wherein the level of data loss risk associated with a storage unit is determined to increase as the number of the encoded data slices determined to be unavailable in the storage unit increases;
identifying a physical location for each of the plurality of storage units having at least one encoded data slice determined to be unavailable;
generating an overall repair plan for the plurality of storage units based, at least in part, on the level of data loss risk associated with the encoded data slices of each of the plurality of storage units, the overall repair plan including a respective repair plan for each storage unit of the plurality of storage units, wherein repairs associated with the highest determined level of data loss risk are prioritized in the overall repair plan; and
issuing each respective repair plan for receipt by a corresponding storage unit of the plurality of storage units.

10. The distributed storage network (DSN) of claim 9, wherein generating the overall repair plan includes generating an ordered list of maintenance tasks to be performed on the plurality of storage units.

11. The distributed storage network (DSN) of claim 10, wherein maintenance tasks associated with the highest determined level of data loss risk are prioritized in the ordered list of maintenance tasks.

12. The distributed storage network (DSN) of claim 10, wherein generating an ordered list of maintenance tasks includes mapping each of the maintenance tasks to at least one service operator.

13. The distributed storage network (DSN) of claim 12, wherein mapping each of the maintenance tasks to the at least one service operator includes:
estimating an amount of time required to perform each of the maintenance tasks; and
mapping the maintenance tasks to a plurality of service operators such that an approximately equal amount of time is estimated to be required of each of the plurality of service operators to perform respective maintenance tasks as mapped.

14. The distributed storage network (DSN) of claim 9, wherein determining a level of data loss risk associated with the set of encoded slices further includes determining a number of simultaneous memory failures affecting a portion of a DSN namespace associated with storage of the encoded data slices.

15. A computing device for use in a dispersed storage network (DSN), the DSN including a set of storage units having memory storing encoded data, the encoded data including a set of encoded data slices corresponding to a data segment of a data object, wherein a decode threshold number of encoded data slices of the set of encoded data slices is required to recover the data segment, the computing device comprises:
 a network interface;
 a local memory; and
 a processor operably coupled to the network interface and the local memory, wherein the processor is configured to:
  obtain, via the network interface, status information regarding storage units of the set of storage units, the status information providing an indication of memory failure;
  determine, based on the status information, that memory of a plurality of storage units of the set of storage units requires repair;
  determine, based on the status information, a level of data loss risk associated with the encoded data stored in the plurality of storage units, including determining a number of the encoded data slices of the set of encoded data slices that are unavailable in respective storage units of the plurality of storage units, wherein the level of data loss risk associated with a storage unit is determined to increase as the number of the encoded data slices determined to be unavailable in the storage unit increases;
  identify a physical location for each storage unit of the plurality of storage units having at least one encoded data slice determined to be unavailable;
  generate an overall repair plan based, at least in part, on the level of data loss risk associated with each of the plurality of storage units, the overall repair plan including a respective repair plan for each storage unit of the plurality of storage units, wherein repairs associated with a highest determined level of data loss risk are prioritized in the overall repair plan; and
  issue, via the network interface, each respective repair plan for receipt by a corresponding storage unit of the plurality of storage units.

16. The computing device of claim 15, wherein generating the overall repair plan includes generating an ordered list of maintenance tasks to be performed on the plurality of storage units.

17. The computing device of claim 16, the processor further configured to:
 prioritize, in the ordered list of maintenance tasks, maintenance tasks that are associated with the highest determined level of data loss risk.

18. The computing device of claim 16, the processor further configured to:
 obtain, via the network interface, information regarding one or more service operators; and
 map each of the maintenance tasks to a service operator of the one or more service operators.

* * * * *